June 14, 1955     H. BUERGER     2,710,776
ORNAMENTAL VEHICLE WHEEL ASSEMBLY
Filed Feb. 4, 1953     2 Sheets-Sheet 1
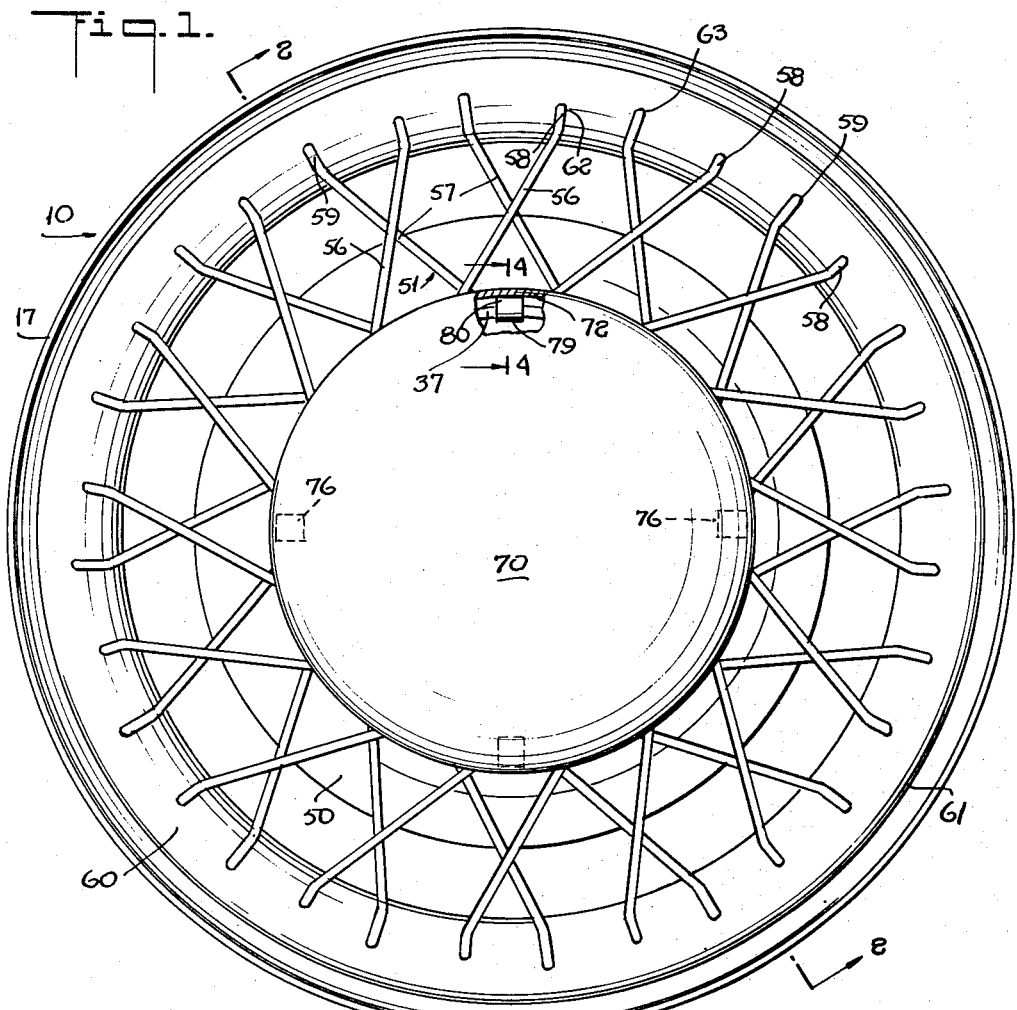
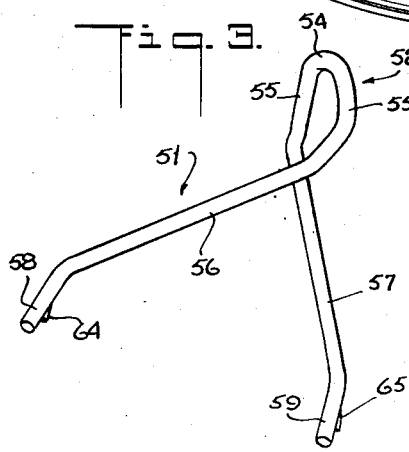
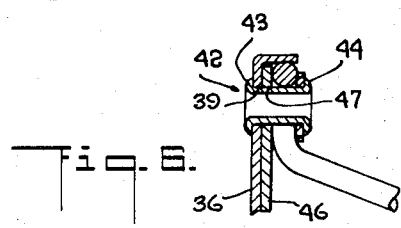
INVENTOR.
HERBERT BUERGER
BY
ATTORNEY

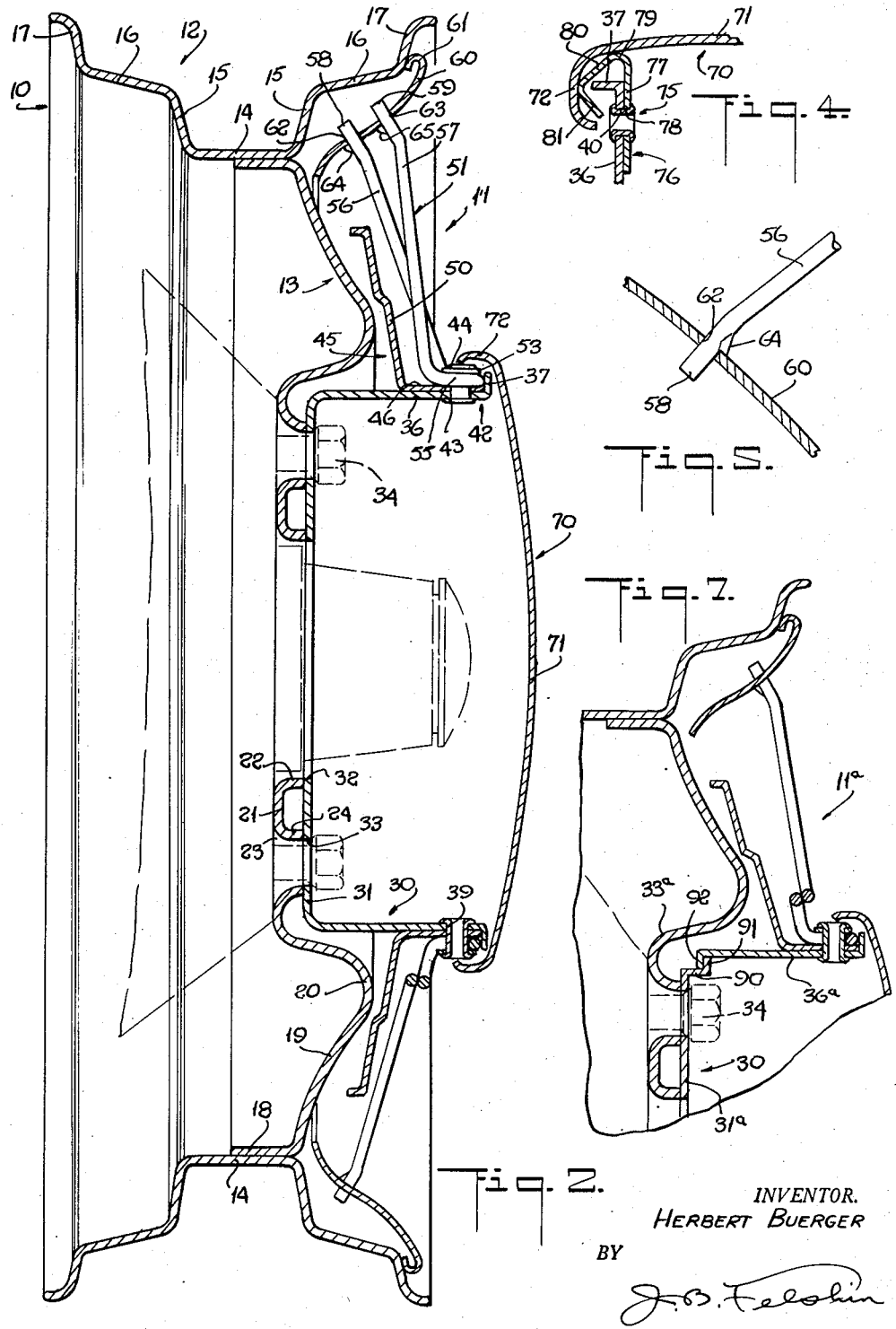

United States Patent Office 2,710,776
Patented June 14, 1955

2,710,776

ORNAMENTAL VEHICLE WHEEL ASSEMBLY

Herbert Buerger, Walton, N. Y., assignor to Del-Krome Corp., Walton, N. Y., a corporation of New York Application February 4, 1953, Serial No. 334,994

19 Claims. (Cl. 301—37)

This invention relates to ornamental vehicle wheel assemblies. It is particularly directed to a wire spoke wheel simulating assembly attachable to a vehicle wheel to enhance the appearance thereof.

An object of this invention is to provide an assembly of the character described, comprising a center member attachable by screws or bolts to the body of the wheel, a plurality of wire spokes attached to the center member, and an outer ring on the outer ends of the spokes and engaging the rim of the wheel.

Another object of this invention is to provide an assembly of the character described including a polished skirt attached to the center member and interposed between the spokes and the body of the wheel to serve as a background for the spokes to enhance the appearance of the wheel.

Yet another object of this invention is to provide an assembly of the character described, in which the center member is in the form of a cup, the bottom wall of which is attachable to the body of the wheel, said cup having a cylindrical wall to which the spokes and skirt are attached.

Still another object of this invention is to provide in an assembly of the character described, a hub cap and means to snap the hub cap on the outer rim of the cup so that the hub cap may be removed to give access to the screws or bolts which attach the cup to the body of the wheel.

Still another object of this invention is to provide an assembly of the character described, in which the outer ring is formed with circles of through openings in different planes, and the outer ends of the spokes pass through said openings, and said spokes being formed with upset abutment lugs engaging the underside of the ring so as to space the ring concentrically with respect to the cup.

Yet a further object of this invention is to provide in an assembly of the character described, a cup comprising a plate bolted to the body of the wheel, and a cylinder engaging said plate, such construction allowing turning of the assembly before tightening the bolts which attach the plate to the body of the wheel, so as to adjust the valve hole relative to the air valve stem.

Yet another object of this invention is to provide a strong, rugged and durable construction of the character described, which shall be relatively inexpensive to manufacture, which may be easily assembled and readily attached to the vehicle wheel, and which shall yet be attractive in appearance and practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention:

Fig. 1 is a front elevational view of a vehicle wheel without the tire, with the wheel assembly embodying the invention mounted thereon, and with parts broken away and in cross section;

Fig. 2 is a cross sectional view taken on the line 2—2 of Fig. 1 but showing the spoke at the upper end of the figure in full lines and not in cross section;

Fig. 3 is a perspective view of one of the spokes;

Fig. 4 is an enlarged cross sectional view taken on the line 4—4 of Fig. 1;

Fig. 5 is an enlarged detail view showing one of the spoke arms passing through the outer ring;

Fig. 6 is an enlarged cross sectional view showing the attachment of one of the spokes to the cup and skirt; and Fig. 7 is a cross sectional view similar to Fig. 2 but illustrating a modified construction.

Referring now in detail to the drawing, 10 designates a vehicle wheel, such as an automobile wheel, and 11 designates a vehicle wheel wire spoke simulating assembly embodying the invention and mounted on the wheel 10. The wheel 10 may be of conventional construction and comprises a rim part 12 and a body part 13. The rim part 12 may be of usual drop center type, and comprises a base web 14, a pair of opposite side walls 15 extending from said web and outwardly projecting flanges 16 extending from said walls. Extending from the flanges 16 are rim edge portions 17.

The body part 13 of the wheel comprises an outer cylindrical flange 18 contacting and fixed to the base web 14. Extending from the cylindrical flange 18 is an inwardly tapered web portion 19 from which extends a curved web portion 20. Extending from said portion 20 is a flat circular portion 21 for mounting the wheel on an axle hub (not shown). Said portion 21 is formed with an outwardly extending cylindrical rim flange 22. It is also formed with a plurality of equi-angularly spaced openings 23 and with annular bosses 24 at each opening projecting outwardly. As stated above, the wheel may be of conventional construction and is shown merely for the purpose of illustration.

The assembly 11 embodying the invention comprises a central cup 30. Said cup 30 comprises a flat bottom wall 31 formed with a central opening 32 registering with the opening formed by the flange 22. The wall 31 rests on the edge of the flange 22 and also on the edges of the bosses 24. The wall 31 is formed with a plurality of equi-angularly spaced openings 33 registering with the openings 23 for receiving screws 34 which attach both the cup 30 to the body 13 and which furthermore attach the wheel to the usual hub which receives the wheel axle.

The cup 30 furthermore comprises a cylindrical wall 36 which extends from the wall 31. Cylindrical wall 36 is formed with an annular outwardly extending flange 37 at its outer end. Said cylindrical wall 36 is formed with sixteen or any other suitable number of equi-angularly spaced openings 39 and with four or other suitable number of openings 40 spaced apart equi-angularly and offset from the openings 39. Extending through each of the openings 39 is an eyelet or rivet 42, one head or flange 43 of which contacts the inner surface of the cylindrical wall 36 and the other head or flange 44 of which is spaced from the outer surface of said cylindrical wall. Surrounding the cup 30 is an annular polished skirt 45. The skirt 45 comprises a cylindrical wall 46 contacting the outer surface of the cylindrical wall 36 of the cup 30. Said wall 46 is formed with openings 47 registering with the openings 39 and receiving the rivets or eyelets 42 therethrough.

Extending from the cylindrical wall 46 is a rearwardly and outwardly tapered ornamental skirted portion 50 spaced from the web portions 19 and 20 of the wheel body 13. Mounted on each rivet 42 is a spoke member 51 which may be made of metal wire stock. There are sixteen or any other suitable number of said members 51. Each one comprises a central loop portion 52 contacting the outer surface of cylindrical wall 46 and surrounding one of the rivets 43 between the head 44 and the said cylindrical wall 46. Between each loop portion 52 and rivet portion 44 is a washer 53.

Each loop portion 52 comprises a semi-circular or curved or round bent portion 54 from which extends slightly outwardly divergent portions 55. Extending from portions 55 are arms 56 and 57 which cross each other to form a V. Said arms 56, 57 do not touch one another but are slightly spaced from one another.

At the outer end of arm 56 is a radial portion 58 and at the outer end of arm 57 is a radial portion 59. It will be noted that the arms 56, 57 cross each other when looking full face at the wheel as in Fig. 1. Said arms cross each other fairly close to the portions 55. Also when looking at the spoke member 51 sideways as shown at the upper end of Fig. 2, the arms 56, 57 cross each other, the outer ends of arms 57 being in a plane parallel to a plane through the outer ends of the arms 56 and spaced to the right thereof.

Mounted on the outer ends of the radial portions 58, 59 is an outer ring 60 which contacts the wheel rim 12. The ring 60 is generally tapered as shown in the drawing, and its outer rim 61 contacts one of the flanges 17. The ring 60 is formed with two circles of openings, that is, an inner circle of openings 62 and an outer circle of openings 63. The radial portions 58 and 59 are formed with upset outwardly extending lugs 64 and 65, respectively, engaging the inner surface of the ring 60 to retain said ring in concentric relation to the cup.

It will be noted that the arms 56, 57 of each spoke member 51 cross arms 57 and 56 of adjacent spoke members on a circle of greater radius than the circle of the crossing portions 56, 57 of each spoke member.

It will also be noted that the skirted member 50 is spaced not only from the body 13 of the wheel 10 but also from the spoke members 51.

The construction described herein permits easy assembly. The spoke members are first bent to shape and then the lugs 64, 65 are formed in a jig so as to insure accuracy, since the wire is not bent after the lugs have been formed. The arms 56, 57 of each spoke may be pulled apart somewhat before insertion into openings 62, 63, whereby the spoke members will resiliently grip the ring.

The cup 30 may be enclosed and covered by a hub cap 70. Hub cap 70 comprises a central outwardly dished portion 71 formed at its outer rim with a rearwardly extending inwardly curved flange 72. Means is provided to permit the hub cap 70 to be snapped onto the cup. To this end there is attached to the cylindrical wall 36 of the cup 30, by means of rivets 75 passing through openings 40, springs 76. Each spring 76 comprises an arm 77 formed with an opening 78 registering with opening 40 and through which rivet 75 passes. Arms 77 extend beyond the flange 37.

Extending from each arm 77 is an outwardly and backwardly bent portion 79 from which extends an outwardly and rearwardly inclined portion 80. Extending from portion 80 is an inwardly and rearwardly inclined finger 81. The rim portion 72 of the hub cap will snap onto the resilient portions 80, 81 of the springs 76. With such construction the hub cap may be removed to give access to the screws 34 and to the center of the wheel axle.

It will be noted that the axes of the loops 52 are radial with respect to the wheel. It will be also noted that both arms 56 and 57 are inclined rearwardly and outwardly. The arms 56 have more inclination than the arms 57 as shown at the upper end of Fig. 2.

In Fig. 7 there is shown a modified assembly 11a similar to the assembly 11 with the exception that the cup 30 of assembly 11 is replaced by a cup 30a comprising two parts, one a plate 31a formed with openings 33a to receive the bolts 34, and the second a cylindrical wall 36a engaging the plate 31a in the manner hereinafter appearing. Plate 31a is formed at its outer end with an outwardly extending cylindrical flange 90 formed with an annular outwardly extending lip or bead 91. The cylindrical wall 36a is formed at its inner end with an annular lip or bead 92 engaging the lip 91. The advantage of this construction is that the separate plate 31a allows turning of the assembly before tightening in order to adjust the valve hole to the air valve stem. Otherwise assembly 11a is similar to assembly 11.

It will thus be seen that there is provided a device in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention in some detail what I claim as new and desire to protect by Letters Patent of the United States, is:

1. An assembly of the character described, comprising a central member, a hub cap mounted thereon, a plurality of spoke simulating members attached to said central member and each comprising a pair of crossing arms, and a ring concentric with said central member and formed with openings receiving the outer ends of the crossing arms, each of said spoke members comprising a looped mid-portion integral with said arms and having an opening therethrough, said central member having an annular series of apertures extending in a plane perpendicular to the axis of the central member, said apertures having axes extending radially of said central member, each of said spoke member mid-portion openings being coaxial with a respective one of said apertures, and a plurality of fastening means each extending through one of said mid-portion openings and its respective aperture of the central member for securing said spoke member mid-portions to said central member.

2. The combination of claim 1 and a skirt on said central member underlying the crossing arms of said spoke simulating members.

3. The combination of claim 2, said hub cap having a portion overlying said mid-portions of said spoke members.

4. An assembly comprising a central annular member, a plurality of spoke simulating members each made of wire and having a pair of crossing arms interconnected by a loop extending in a plane parallel to the axis of the central member, means to rivet said loops to said central member, said spoke simulating members being so arranged that the arms of each member crosses the arms of adjacent members, an outer ring concentric with said central member, and means for attaching the outer ends of said crossing arms to said ring, said ring having a first annular series of openings extending in a first plane perpendicular to the axis thereof and a second annular series of openings extending in a second plane parallel to but spaced axially from said first plane, the outer end of one arm of each spoke member extending through a respective one of said first series of openings and the outer end of the other arm of each spoke member extending through a respective one of said second series of openings.

5. The combination of claim 4, and a skirt on said central member underlying said spoke simulating members.

6. The combination of claim 4, said spoke simulating members being generally inclined to the axis of said central member and extending in a direction axially inwardly and radially outwardly with respect to said axis.

7. An assembly of the character described, comprising a central cup having a bottom wall formed with holes to receive hub screws and a cylindrical wall extending from the bottom wall, a plurality of spoke simulating members, each spoke simulating member comprising a pair of crossing arms, and an outer ring concentric to said cup and formed with openings to receive the outer ends of said crossing arms, each of said spoke members comprising a loop mid-portion lying adjacent the exterior surface of said cup cylindrical wall and secured to the latter and extending in a plane parallel to the axis thereof.

8. The combination of claim 7, in combination with a hub cap, and spring means on said cup to resiliently receive the hub cap snapped thereon, said hub cap having a peripheral flange portion extending axially inwardly over said spoke member loop mid-portions.

9. The combination of claim 8, in combination with a skirt surrounding and attached to the cylindrical wall, and having a portion underlying the spoke simulating members.

10. An assembly of the character described, comprising a central mmeber, means to attach the central member to the body of a vehicle wheel, a plurality of spoke simulating members, a ring concentric with said central member and adapted to contact the rim of the vehicle wheel, means to mount said ring on said spoke simulating members, said central member having a cylindrical wall coaxial with said ring, said spoke simulating members each comprising a radially innermost portion lying in a plane parallel to the axis of said cylindrical member and adjacent to the exterior surface thereof and secured thereto, said spoke simulating members each comprising a radially outer portion integral with said innermost portion and extending in a direction inclined with respect to the cylindrical wall axis radially outwardly and axially inwardly with respect to the latter.

11. The combination of claim 10, in combination with a hub cap mounted on the central member and having a peripheral flange portion extending axially inwardly and overlying said innermost portions of said spoke simulating members.

12. The combination of claim 11, in combination with a member attached to the central member and provided with a skirted portion underlying said spoke simulating members.

13. An assembly of the character described comprising a central member adapted to be attached to the body of a vehicle wheel, a plurality of spoke simulating members, a ring concentric with the central member and adapted to contact the rim of said wheel and formed with openings receiving the outer ends of said spoke simulating members, lugs on said spoke simulating members abutting the inner surface of said ring to retain said ring in concentric relation to said central member, said central member having a cylindrical wall coaxial with said ring, said spoke simulating members each comprising a radially innermost portion lying in a plane parallel to the axis of said cylindrical member and adjacent to the exterior surface thereof and secured thereto, said spoke simulating members each comprising a radially outer portion integral with said innermost portion and extending in a direction inclined with respect to the cylindrical wall axis radially outwardly and axially inwardly with respect to the latter, a first annular series of said ring openings extending in a first plane perpendicular to the axis of the ring and a second annular series of said ring openings extending in a second plane parallel to but spaced axially inwardly from said first plane, a plurality of said outer ends of the spoke simulating members projecting within said first series of ring openings and the other outer ends of the spoke simulating members projecting within said second series of ring openings.

14. An assembly of the character described, comprising a central member adapted to be attached to the body of a vehicle wheel coaxially therewith, a plurality of spoke simulating members attached to said central member and each comprising a pair of diverging arms, a ring concentric with said central member and formed with two annular series of openings, each series being located in a respective one of a pair of spaced parallel planes, one arm of each spoke simulating member being received in an opening of one series of openings, and the other arm of each of the spoke simulating members being received in an opening of the other series of openings, and lugs on said arms engaging the inner side of said ring to retain said ring in concentric relation to said central member.

15. The combination of claim 14, the arms of each spoke simulating member crossing one another and being interconnected by a loop, and rivets on said central member and passing through said loops for fixing said simulating members to said central member.

16. The combination of claim 15, the arms of each spoke simulating member crossing arms of adjacent spoke simulating members.

17. The combination of claim 15, and a skirted member attached to the central member and having a flaring portion underlying said arms.

18. The combination of claim 17, said central member being in the form of a cup, a hub cap, and spring means to resiliently mount the hub cap on said cup.

19. In an assembly as recited in claim 14, said spoke simulating members being resilient and under flexural stress tending to move said arms relative to each other thereby securely retaining said ring on the arms.

References Cited in the file of this patent

UNITED STATES PATENTS

| | | |
|---|---|---|
| D. 168,977 | Ryerson | Mar. 3, 1953 |
| 779,877 | Schofield | Jan. 10, 1905 |
| 1,799,712 | Wagenhorst | Apr. 7, 1931 |
| 2,069,952 | Hoffman | Feb. 9, 1937 |

FOREIGN PATENTS

| | | |
|---|---|---|
| 714,587 | France | Sept. 7, 1931 |